United States Patent [19]

Bouvin et al.

[11] 4,183,227
[45] Jan. 15, 1980

[54] HEAT PUMP

[75] Inventors: Jacques Bouvin, St. Martin-du-Vivier; Christian C. Jahan, Bois-Guillaume, both of France

[73] Assignee: Exxon Research & Engineering Co., Florham Park, N.J.

[21] Appl. No.: 868,047

[22] Filed: Jan. 9, 1978

[30] Foreign Application Priority Data

Jan. 17, 1977 [GB] United Kingdom ............... 1691/77

[51] Int. Cl.² ..................... F25B 17/08; F25B 15/10
[52] U.S. Cl. ........................................ 62/480; 62/490
[58] Field of Search ................................. 62/480, 490

[56] References Cited
U.S. PATENT DOCUMENTS

| | | | |
|---|---|---|---|
| 1,833,901 | 12/1931 | Hull | 62/490 |
| 1,904,024 | 4/1933 | Wright | 62/480 |
| 1,943,968 | 1/1934 | Hulse | 62/480 |
| 2,088,276 | 7/1937 | Nesselmann et al. | 62/480 |
| 2,293,556 | 8/1942 | Newton | 62/480 |
| 3,828,566 | 8/1974 | Wetzel | 62/480 |

*Primary Examiner*—Lloyd L. King
*Attorney, Agent, or Firm*—Joseph J. Dvorak

[57] ABSTRACT

A heat pump providing semi-continuous or substantially continuous refrigeration and/or heating in which liquid working fluid in a vaporizer vaporizes at a low pressure by extracting heat from a cold heat source and the vapors are adsorbed in at least one solid adsorbent body. The adsorbent is subsequently heated to desorb vapors at a high pressure, and the vapors condense by giving up heat to a heat sink at a relatively high temperature. The condensed liquid is returned via pressure-reducing means to the vaporizer, and the adsorbent body is cooled. There may be several adsorbent bodies undergoing heating and cooling out of phase with each other.

7 Claims, 4 Drawing Figures

HEAT PUMP

The present invention relates to heat pumps which may be employed in, or with, cooling or heating systems.

A distinction is generally made between heat pumps that operate with two sources of heat and a contribution of mechanical energy and those which operate without contribution of mechanical energy, but employ at least three sources of heat. The former comprise a compressor to which the necessary mechanical energy for its operation is supplied. They have been used regularly for a very long time as refrigerating machines. Attempts have been made to use them for heating, but difficulties have been encountered. Indeed, when used for heating, the compressor is subjected to relatively high temperatures and it is difficult to ensure proper lubrication, especially in the case of a high-power installation.

Among the heat pumps operating with three sources of heat, the best known are absorption pumps. These have no compressor, but they tend to be highly complex installations. They make use of a condensable gas and a solvent for the gas, the gas usually being ammonia and the solvent water. In a conventional absorption machine, ammoniacal brine is fractionated under pressure using a first evaporator and a rectifying column. The ammonia condenses, giving up heat to a hot heat sink, which is defined as a heat sink at a relatively elevated temperature and then, by means of an expander, it passes into an evaporator where, as it vaporises, it absorbs heat from a cold heat source, which is defined as a source of heat at a relatively low temperature. The ammonia gas is brought into contact in an absorber with the ammonia-lean brine from the first evaporator, and it dissolves while giving up further heat to the hot heat sink. Finally, the thus enriched brine is circulated by a pump which passes it under pressure to the first evaporator.

Heat pumps employing three sources of heat based on the adsorption of a gas on a solid, have been described in the past. Such pumps comprise two heat exchangers which communicate freely and one of which contains a solid adsorbent. The other exchanger acts alternately as a condenser and as an evaporator for a condensable gas capable of being fixed reversibly on the adsorbent and of subsequently being removed therefrom, at least in part. In a first stage of operation, the exchanger containing the adsorbent is strongly heated so as to desorb the gas and the latter is condensed in the other exchanger while supplying heat to a hot heat sink. In a second stage of operation, the exchanger containing the adsorbent is cooled so as to readsorb the gas, while the condensate is evaporated in the other exchanger, this time heat being removed from a cold heat source. It is difficult to use this type of heat pump in practice for several reasons. For example, it is not readily possible to produce a heat exchanger that is able to act both as condenser and as evaporator; the necessity of bringing this exchanger into contact alternately with the hot heat sink and with the cold source entails complications; finally, the operation of this device is necessarily intermittent.

An object of the present invention is to provide a heat pump which avoids or is not subject to at least some of the drawbacks of the type of heat pump employing a solid absorbent for an adsorbable gas, as described above.

The present invention provides a heat pump comprising an evaporator for containing a volatile liquid in heat exchange relationship with a cold heat source (as herein defined), the liquid being selected so as to vaporize at a temperature $T_1$ and a pressure $P_1$ during operation of the heat pump when the liquid in the evaporator is in heat exchange relationship with the cold heat source, a body of adsorbent material selected to be capable of adsorbing vaporized liquid substantially at the pressure $P_1$ and at a temperature $T_2$ and of desorbing adsorbed liquid at a pressure $P_2$ exceeding $P_1$ and a temperature $T_3$ exceeding $T_2$, the body of adsorbent material being connected to receive vaporized liquid from the evaporator via means which resist the passage of vaporized liquid to the evaporator, means for alternately lowering and raising the temperature of the adsorbent material to $T_2$ and $T_3$ respectively, at least one condenser connected for receiving desorbed liquid from the body of adsorbent material substantially at the pressure $p_2$ and at a temperature $T_4$ which is below $T_3$ but higher than $T_2$ when the condenser is in heat exchange relationship with a hot heat sink whereby the desorbed liquid is condensed and heat therefrom is discharged to the hot heat sink, there being means resisting the passage of desorbed liquid from the condenser to the body of adsorbent material, the condenser being connected to the evaporator by means for passing condensed liquid to the evaporator, preferably at a desired rate, and for reducing the pressure of the liquid substantially from $p_2$ to $p_1$.

The heat pump may comprise a plurality of bodies of adsorbent material so arranged that at least a first body will adsorb vaporized liquid from the evaporator while at least a second body will desorb adsorbed liquid for passage to the condenser, each body of adsorbent material being connected to receive vaporized liquid from the evaporator via means which resist the passage of vaporized liquid back to the evaporator, and being connected to the, or a respective, condenser via means which resist the passage of desorbed liquid back to the body of adsorbent material.

There may be a discrete condenser for receiving desorbed liquid from a respective body of adsorbent material, each condenser being connected to the evaporator by means for reducing the pressure of condensed liquid substantially from $p_2$ to $p_1$ and for regulating the passage of condensed liquid to the evaporator at a desired rate.

The heating and/or cooling of the or each body of adsorbent material may conveniently be effected by a heat transfer medium.

The heat pump preferably comprises a heat exchanger for cooling the heat transfer medium when the or each body of adsorbent material is to be cooled.

There may be provided diverting means for causing at least some heat transfer medium to circulate in said heat exchanger when the or each body of adsorbent material is to be cooled.

The construction and arrangement of the heat pump may be such that, during operation, heat transfer medium is circulated in the heat exchanger for cooling before it is employed for cooling the or each body of adsorbent material.

The heat pump may comprise means for causing the direction of circulation of the heat transfer medium relative to the heat exchanger and heating means to be reversed when one body of adsorbent material is substantially desorbed of desorbable adsorbed liquid substantially at temperature $T_3$ whereby said one body is then cooled for adsorbing vaporized liquid and another body of adsorbent material is then heated by heat transfer medium for desorbing desorbable adsorbed volatile liquid. The said means for causing the direction of circulation of the heat transfer medium to be reversed may comprise a reversible pump and/or one or more valves.

The heat pump may be so constructed and arranged that, in operation, the heating of the or each body of adsorbent material is effected by one heat transfer medium at a relatively elevated temperature, and the cooling of the or each body of adsorbent material is effected by another heat transfer medium at a relatively lower temperature, the two heat transfer media being separately circulated, and there being means for passing a respective one of the media in contact with the or each body of adsorbent material at a time.

Preferably there are means for circulating condensed liquid passing to the evaporator in heat exchange relationship with vapour passing to the body, or one of the bodies, of adsorbent material.

The or each body of adsorbent material is preferably contained in a suitable vessel. A convenient adsorbent material is active carbon although other materials such as silica or zeolites may be employed. The volatile liquid may comprise one or more hydrocarbons having 3 or 4 carbon atoms per molecule.

The invention further provides a refrigerating installation comprising a heat pump as described above wherein the heat pump operates as a refrigerating machine.

The invention moreover provides a heating installation comprising a heat pump as described above wherein the heat pump operates as a heating device or heat source.

The invention further provides the combination of a refrigeration installation and a heating installation wherein a heat pump, as described above, operates to remove heat from at least part of the refrigeration installation and to furnish heat to at least part of the heating installation.

The invention is now further described by way of non-limitative examples only and with reference to the accompanying schematic drawings, wherein.

Figure 1:
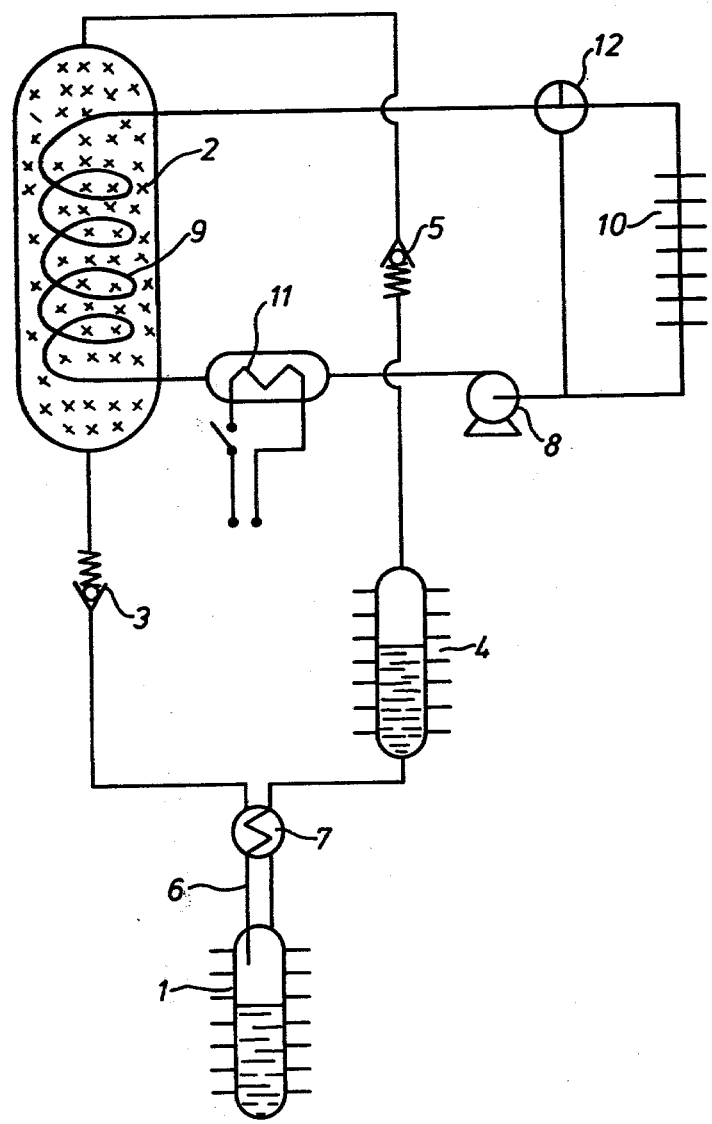
FIG. 1 is a schematic flow diagram of one embodiment of a heat pump according to the invention.

Referring first to FIG. 1, an evaporator 1 containing volatile liquid abstracts heat from a cold heat source (e.g. the ambient air, or more preferably a river, lake or sea) and the liquid evaporates at a temperature $T_1$ and a pressure $p_1$. In a first stage of operation, the vapour of the evaporated liquid attaches itself to adsorbent 2 contained in a suitable vessel, while the adsorbent 2 is kept at a temperature $T_2$ exceeding $T_1$ by recovering, removing or dissipating the heat given off by adsorption. A valve 3 opposes the return of vapour from the vessel to the evaporator 1. In a second stage of operation, when the adsorbent 2 is virtually substantially saturated at the temperature $T_2$, the vessel and the adsorbent 2 are heated to a temperature $T_3$ at which substantially total desorption of the desorbable absorbate is obtained. A valve 5 opposes the return of desorbed vapour to the vessel and the vapour passes to the condenser 4, where it condenses substantially at the pressure $p_2$ of the adsorbent-containing vessel but at a temperature $T_4$, which is considerably in excess of the temperature of the evaporator 1, giving up heat to a hot heat sink (e.g. space heating equipment in a building). The liquid passes from the condenser 4 to the evaporator by means of an expander and/or pressure reducer. The latter may consist simply of a capillary tube 6. When desorption of the adsorbent 2 is completed, the first stage of operation is repeated after the adsorbent 2 in the vessel cools or is cooled by a suitable cooling medium to the temperature $T_2$, and so on. For preference, the liquid passing to the evaporator 1 and the vapour passing to the adsorbent 2 circulate in heat exchange relationship in a heat exchanger 7.

To cool and heat the adsorbent alternately, it is possible to use a liquid heat transfer medium circulating in a circuit which comprises, as represented diagrammatically in FIG. 1, a pump 8, a heat exchanger 9 in heat exchange relation with the adsorbent 2, a heat exchanger 10 in which the heat transfer medium in cooled before and during the vapour adsorption step, means 11 for heating the heat transfer medium during the vapour desorption step, and a three-way valve 12 to short-circuit the heat exchanger 10 during desorption.

A system that comprises a single body of adsorbent material necessarily has an intermittent functioning. According to a preferred variant of the invention, the system comprises two or more bodies of adsorbent material which operate in turn so as to ensure continuous, or more continuous, pumping of heat.

Figure 2:
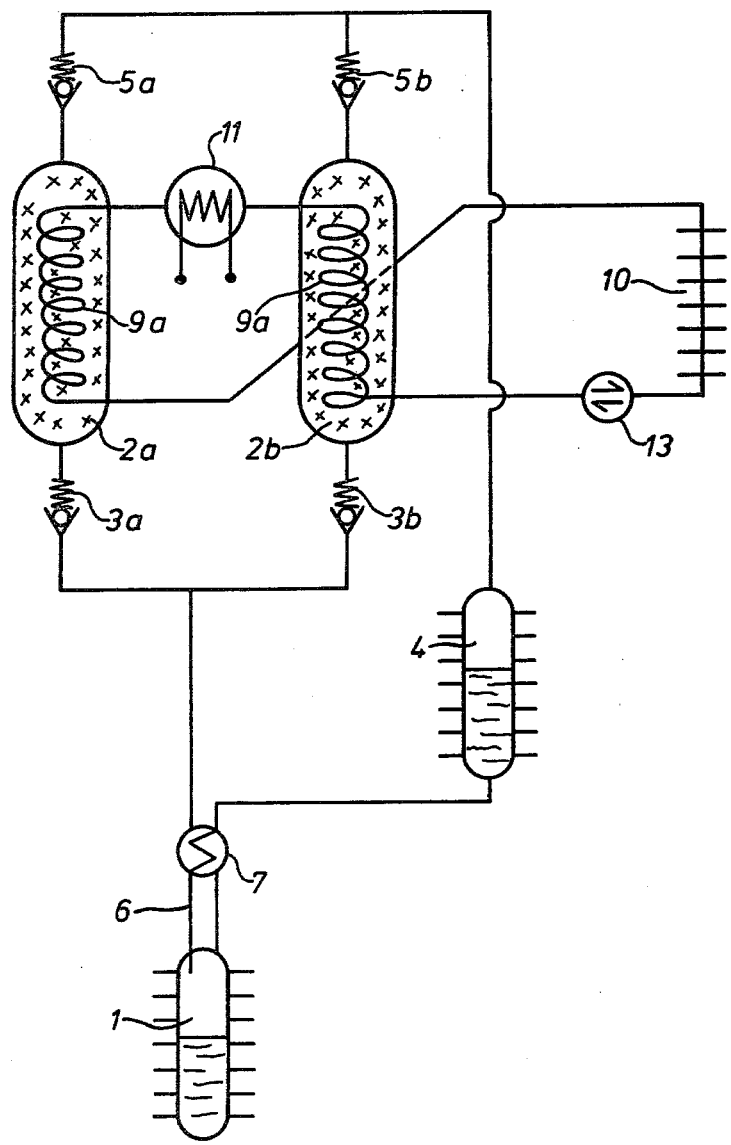
FIG. 2 is a schematic flow diagram of another embodiment of a heat pump of the invention.

FIG. 2 represents diagrammatically an embodiment in which two vapour adsorbers $2a$, $2b$ are connected to the same evaporator 1 via non-return valves $3a$, $3b$ and to the same condenser 4 by means of non-return valves 5, $5b$, the alternate heating and cooling of the two adsorbers being effected by the action of a liquid heat transfer medium which circulates in a circuit having two heat exchangers $9a$, $9b$ in respective heat exchange relationship with these adsorbers, heating means 11 between the exchangers $9a$, $9b$, a heat exchanger 10 and a reversible pump 13. As soon as the adsorption in an adsorber and the desorption in another adsorber are completed, the actions of the two adsorbers are changed by reversing the direction of circulation of the heat transfer medium. There is thus obtained substantially continuous pumping of heat which the evaporator 1 abstracts from the cold heat source to the condenser 4 in heat exchange relationship with the hot heat source.

Figure 3:
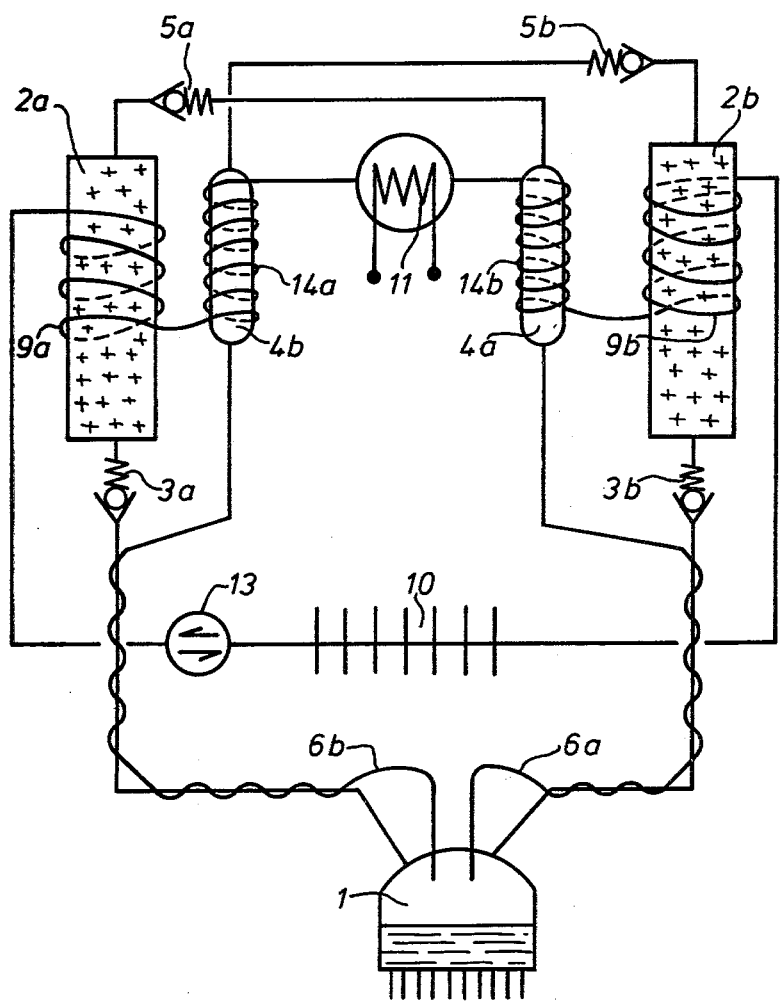
FIG. 3 is a schematic flow diagram of a further embodiment of a heat pump according to the invention.

FIG. 3 represents diagrammatically an embodiment in which two adsorbers $2a$, $2b$ containing an adsorbent are connected respectively to two condensers $4a$, $4b$ via non-return valves $5a$ and $5b$. The adsorbers are also connected to the evaporator 1 by means of non-return valves $3a$ and $3b$. A liquid heat transfer medium, circulated by a reversible pump 13, is cooled by passage through heat exchanger 10, thereby supplementing the total heat output of the system. When the adsorber $2a$ is adsorbing and the adsorber $2b$ desorbing, the heat transfer medium, which has been cooled in passing through the exchanger 10, is reheated by passing in sequence through a coil $9a$ in heat exchange relationship with the adsorber $2a$, a coil $14b$ in heat exchange relationship with the condenser $4b$ and the heater 11 which is operative to heat the heat transfer medium. After being raised to a relatively high temperature in the heater 11, the heat transfer medium next heats the coil $14b$, the condenser 4a and the adsorber 2b and in the latter causes desorption of desorbable absorbate while passing through a coil 9b in heat transfer relationship with adsorber 2b. As soon as adsorption in adsorber 2a and desorption in adsorber 2b are substantially completed, the direction of rotation of the pump 13 is reversed to change over the roles of the two adsorbers so that adsorption proceeds in adsorber 2b and desorption in adsorber 2a.

Figure 4:
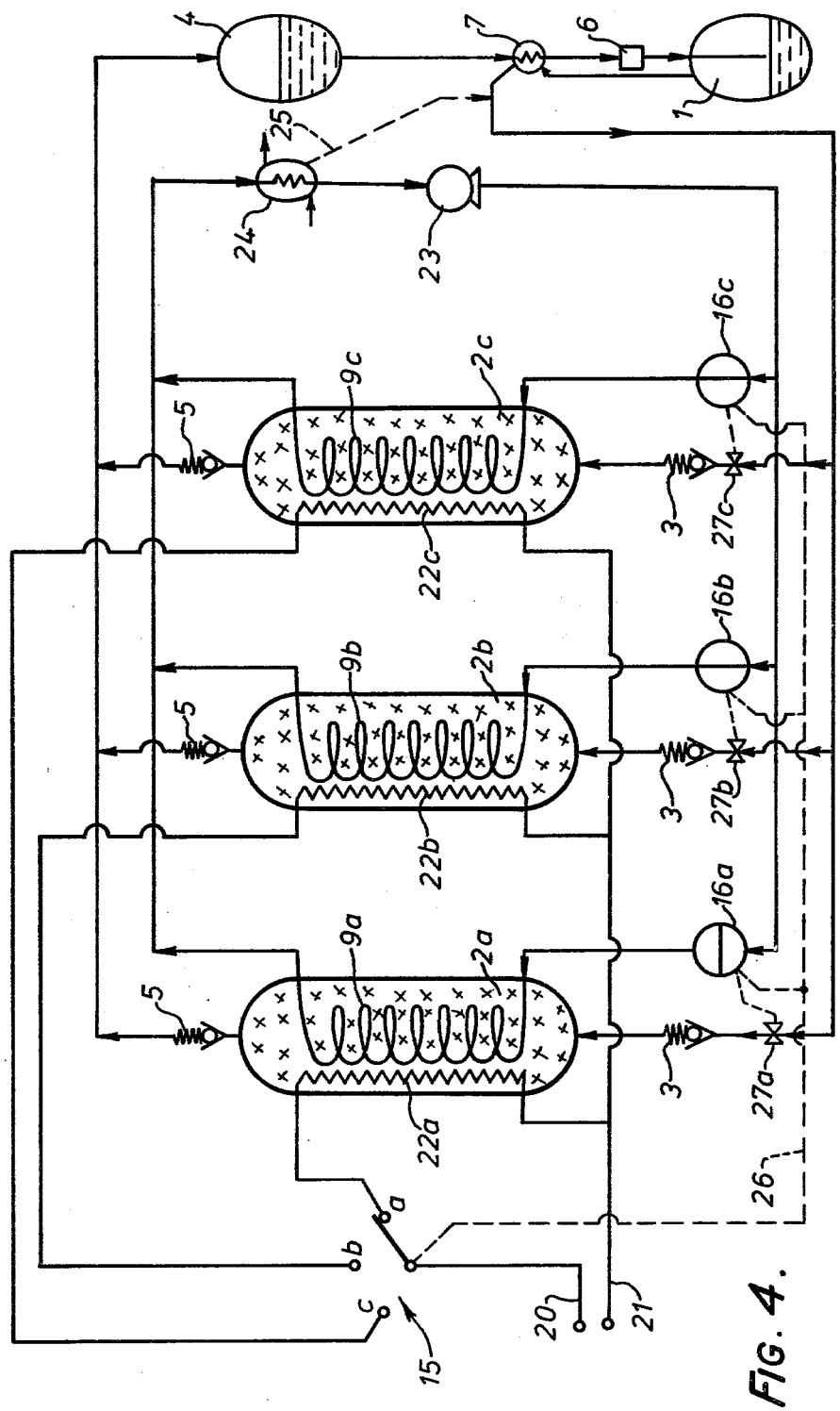
FIG. 4 is a schematic flow diagram of another embodiment of a heat pump according to the invention.

Instead of employing a reversible pump with a single heat transfer medium, there may be employed, in another type of embodiment, pumps which circulate two heat transfer media each in a constant sense around respective circuits. One medium is maintained at a relatively elevated temperature for desorbing adsorbate from adsorbent and the other at a relatively low temperature for promoting the adsorption of vapour by adsorbent. By a suitable arrangement of valves, the hot medium is circulated in heat exchange relationship with the adsorber from which adsorbate is to be desorbed, the cool medium is circulated in heat exchange relationship with the adsorber which is being used to absorb vapour from the evaporator. When adsorbent is desorbed and vapour adsorbed to the desired extent in the respective adsorbers, the valves are adjusted to supply the hot medium to the adsorber containing the adsorbed vapour and the cool medium to the desorbed absorber. The temperatures of the media are maintained by suitable heating and cooling means. A single condenser may be employed for all of the adsorbers, if desired. FIG. 4 shows one exemplification of this type of embodiment. The heating medium is conducted or circulated in or out via one circuit 20 and out or in via another conduit 21, and passed in heat exchange relationship in heat exchange coils 22a, 22b, 22c with adsorbent 2a, 2b, 2c in respect adsorbers depending on the position of the switching means 15. As illustrated, the heating medium is directed by the switching means 15 in position a to coil 22a for heating adsorbent 2a. The cooling medium is circulated by a pump 23 in a constant sense (clockwise as illustrated) to respective adsorbers via corresponding coolant control valves 16a, 16b, 16c and passes through heat exchange coils 9a, 9b, 9c in heat exchange contact with the adsorbent 2a, 2b, 2c. The coolant, after passage through one or more coils 9a, 9b, 9c is conducted to a cooler heat exchanger 24 wherein it is passed in heat exchange relationship with a heat dissipating medium (e.g. ambient air, water and/or at last some of the working fluid which has been evaporated in the evaporator 1 as indicated by the broken arrow 25). As illustrated, the coolant is circulating via valves 16b, 16c to coils 9b, 9c, valves 16a being in the closed position. The positions of the switching means 15 and the valves 16a, 16b, 16c may be coordinated by a suitable ganging arrangement (indicated by broken line 26) to ensure that heating medium is conducted to a heating coil which is not in contact with adsorbent which is being cooled and to ensure that coolant is circulated to a cooling coil which is not in contact with adsorbent which is being heated.

Desorbed working fluid is received in a common condenser 4 which is in heat exchange relationship with a hot heat sink (not shown) and the working fluid liquefies in the condenser, liberating useful heat to the hot heat sink (not shown). Some or all (as illustrated) of the liquid working fluid passes via a heat exchanger 7 and via an expansion valve or engine 6 to an evaporator 1 which is in heat exchange relationship with the cold heat source (not shown). The expansion valve or engine 6 may be regulatable, e.g., as to the amount of working fluid passing therethrough, depending on the heat input requirement from the cold heat source and/or the heat output demand at the hot heat sink. Heat absorbed from the cold heat source causes liquid working fluid to evaporate in the evaporator, and some or all (as illustrated) of the vapourized working fluid is passed in heat exchange in heat exchanger with the liquid working fluid passing to the evaporator 1 before circulating to the adsorbers via valves 27a, 27b, 27c. The latter valves are preferably coupled to the corresponding valves 16a, 16b, 16c to ensure that vapourized working fluid passes into adsorbers which are cool. Alternatively, the valves 27a, 27b, 27c may be arranged to respond to signals from temperature sensors (not shown) in the adsorbent material in such a manner that vapour can pass thereto only when the temperature of the adsorbent, as sensed by the temperature sensors, is below a selected temperature.

Although the foregoing description of FIG. 4 refers to the heating and cooling of the adsorbent being effected by a circulating media (e.g. a fluid), it will be appreciated that the heating or cooling or both can be effected alternatively by other means—e.g. electrically, in which case the well-known means for resistance heating or Peltier/Zeeman effect heating and cooling may be used.

The volatile liquid and the adsorbent materials are chosen as a function of the temperature available and required at the cold heat source and the hot heat sink, respectively. For instance, it is possible to use active carbon as adsorbent and a hydrocarbon with three or four carbon atoms per molecule or a mixture containing such hydrocarbons as volatile liquid.

The heat pump according to the invention can be used as a refrigerating machine. It has, however, more particular application when used as a heat generator in a heating installation. A cooling installation and a heating installation equipped with a heat pump as described is included within the ambit of the invention.

The following non-restrictive example is given to illustrate the functioning of a heat pump of the invention.

EXAMPLE

In the embodiment represented diagrammatically in FIG. 1, butane was used as volatile liquid and active carbon as adsorbent. The temperature being 0° C. and the absolute pressure 1.15 bars in the evaporator, the active carbon at 40° C. adsorbed 9.5% by weight of butane. Desorption was effected by heating the active carbon to 100° C., the latter then retaining only 2% by weight of butane. The conditions in the condenser were a pressure of 6 bars and a temperature of 60° C.

We claim:
1. A heat pump comprising:
two intermittently operated adsorbers;
two condensers and an evaporator common to said adsorbers, said adsorbers, condensers and evaporator being operatively connected so that in a first mode of operation vaporizable liquid from said evaporator can be passed from said evaporator to the first of said adsorbers and be adsorbed therein while vaporizable liquid adsorbed in said second of said adsorbers can be desorbed, sent to the second of said condensers and returned from said condenser through a conduit to said evaporator, and during a second mode of operation said liquid in said evaporator can be sent to said second adsorber for adsorption therein and wherein said liquid adsorbed in said first adsorber can be desorbed and sent to the first of said condensers where it is condensed and returned to said evaporator;

a heat circuit including a heat transfer medium and means for heating said heat transfer medium, said heat circuit being in heat exchange relationship with said adsorbers and said condensers; means for circulating said heat transfer medium in said first mode of operation so that said heat transfer medium is passed in heat exchange relationship with said first adsorber and said second condenser, thereby cooling the vaporizable liquid therein, and thereafter said heat transfer medium is heated by said heating means and then passed in heat exchange relationship with said first condenser and said second adsorber, thereby heating the vaporizable liquid therein, and in said second mode of operation, the flow of said heat transfer medium is reversed whereby said heat transfer medium is first passed in heat exchange relationship with said second adsorber and said first condenser and thereafter is heated by said heating means and passed in heat exchange relationship with said second condenser and said first adsorber.

2. A heat pump according to claim 1 wherein said means for causing the direction of circulation of the heat transfer medium to be reversed is a reversible pump.

3. A heat pump comprising:
an evaporator for containing a vaporizable liquid in heat exchange relationship with a cold heat source;
a plurality of adsorbers containing an adsorbent material selected to be capable of adsorbing vaporized liquid under vapor adsorbing conditions of temperature and pressure and of desorbing adsorbed vaporizable liquid under desorbing conditions, said adsorbers being operatively connected to said evaporator;
at least one condenser operatively connected to said plurality of adsorbers for condensing volatile liqiud during desorption of said adsorbers;

valve means whereby a vaporized liquid from the evaporator is directd to at least one of said adsorbers while said adsorber is under adsorption conditions and will be prevented from flowing when any of such plurality of adsorbers is under desorbing conditions;

a first circuit for a heating medium, said first circuit being arranged for conducting the heating medium in heat exchange relationship with such of said adsorbers which are under desorbing conditions, thereby promoting the desorption therefrom of adsorbed vaporizable liquid in the form of a vaporized liquid at elevated pressure and temperature;

a second circuit for a cooling medium, said second circuit being arranged for conducting the cooling medium in heat exchange relationship with such of said adsorbers which are under adsorbing conditions for cooling the latter and thereby promoting the adsorption of vaporized liquid from the evaporator; and, switching means operable such that when absorbent is desorbed from such of said adsorbers under desorption conditions and adsorbent is adsorbed by such of said adsorbers under adsorbing conditions the cooling medium is passed in heat exchange relationship with the desorbed adsorbers and the heating medium is passed in heat exchange relationship with the adsorbers containing adsorbent.

4. The heat pump of claim 3 wherein said second circuit includes heat exchanger means for the discharge of heat from the cooling medium for maintaining the latter at a temperature suitable for cooling the adsorbers.

5. A heat pump according to claim 4 including means for circulating condensed liquid passing to the evaporator in heat exchange relationship with vapour passing to an adsorber.

6. A heat pump according to claim 3 in which the adsorbent material is active carbon.

7. A heat pump according to claim 4 in which the vaporizable liquid comprises one or more hydrocarbons having 3 to 4 carbon atoms per molecule.

* * * * *